WILLIAM W. WALLIS.
Improvement in Thill Coupling.
No. 125,637.  Patented April 9, 1872.
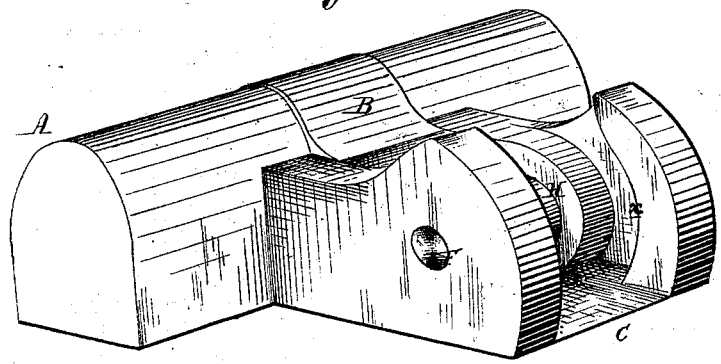
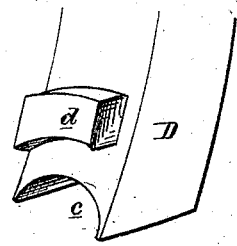
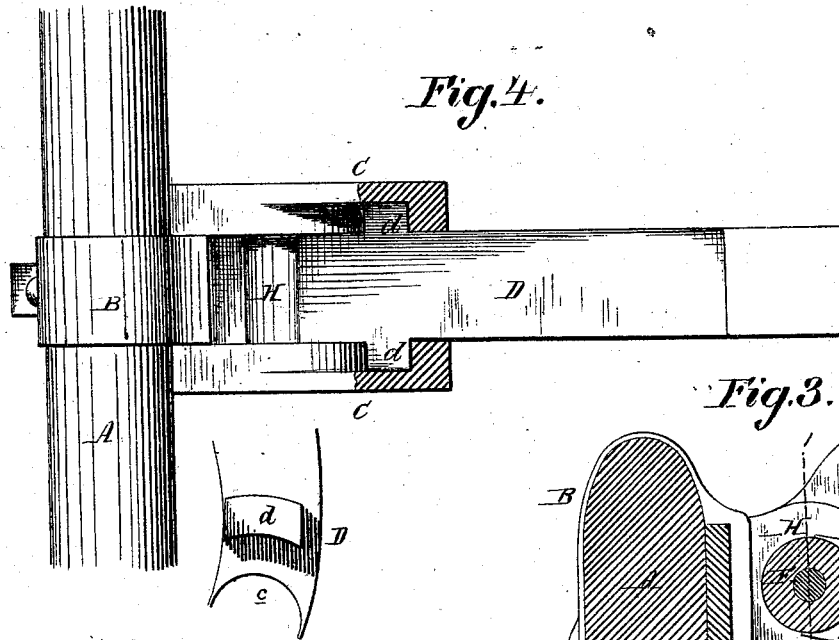
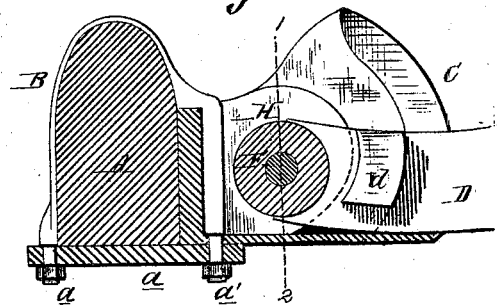
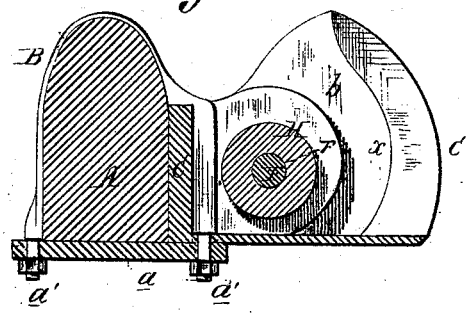
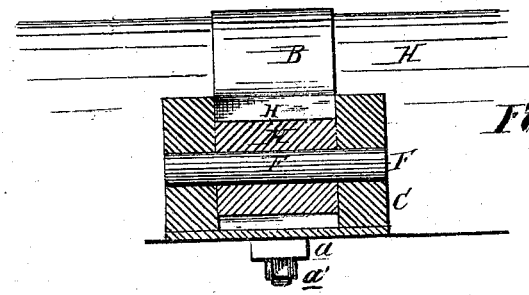
Witnesses: Charles E. Foster, A. M. Norris
Inventor: Wm. W. Wallis
by his Att'y
Howson and Son

UNITED STATES PATENT OFFICE.

WILLIAM W. WALLIS, OF PHILADELPHIA, PENNSYLVANIA, ASSIGNOR TO HIMSELF AND WILLIAM F. BLACKISTON, OF SAME PLACE.

IMPROVEMENT IN THILL-COUPLINGS.

Specification forming part of Letters Patent No. 125,637, dated April 9, 1872; antedated March 26, 1872.

SPECIFICATION.

I, WILLIAM W. WALLIS, of Philadelphia, county of Philadelphia, State of Pennsylvania, have invented an Improved Carriage-Coupling, of which the following is a specification.

My invention consists of a carriage-coupling too fully explained hereafter to need preliminary description, and designed with the view of enabling the shaft or pole of a carriage or other vehicle to be readily coupled or uncoupled; and, also, with the view of preventing the usual disagreeable rattling of the said shafts or pole upon the coupling-pins.

Figure 1 is a perspective view of the coupling-block and end of the shaft detached from each other; Fig. 2, a vertical section of the clip with the shaft detached; Fig. 3, also, a vertical section showing the coupling complete; Fig. 4, a plan view of Fig. 3 partly in section; and Fig. 5, a transverse section on the line 1 2, Fig. 3.

A represents part of the front axle of a carriage or other vehicle; B, a strap passed over the same, and secured at the bottom by a plate, $a$, and nuts $a'$; C, the coupling-block or clip, secured to or forming part of the strap; and D, the end of the pole or shaft, arranged to be fitted to the said clip, as described hereafter. The clip is open at the front and top, and has a transverse pin, F, passing through it, and also through a short tubular block of rubber, H, and on the inner side of each side piece of the clip is a curved groove, $b$, made flaring at the top, and formed eccentrically as regards the pin F and its rubber block—that is to say, the two grooves $b\ b$, which are directly opposite each other, are nearer the pin F at the lower end than at the top. On the end of the shaft D is a semicircular recess, $c$, adapted to the rubber block H, and on the opposite sides of the said shaft are two projections or lugs, $d\ d$, arranged to fit and slide in the eccentric grooves $b$.

In order to connect the shaft to the coupling, the former is elevated to a vertical or nearly vertical position, Fig. 2, and is then dropped into the clip until its recessed end $c$ rests upon the rubber block H, and after having been thus adjusted to the shaft, is turned downward to the position shown in Fig. 3, its projections $d\ d$ entering and sliding down the curved grooves $b$ of the clip, and being forced backward toward the pin F by the eccentricity of the grooves, until the recessed end of the shaft bears against the rubber block H with a sufficient degree of pressure to bind the shaft tightly within the clip, and prevent any rattling of one part against another. The shaft, although thus tightly held between the rubber block and edges $x$ of the grooves $b$, can yield vertically to any desired extent, and can be readily uncoupled by raising it up until its lugs $d$ are free from the grooves $b$. The rubber block consists of a short length of thick leather tubing, held securely in place between the opposite sides of the clip by the pin F, which passes through it, and after becoming worn the said block can be readily removed and be replaced by another, all that is necessary in such case after uncoupling the shafts, being to drive out or unscrew the pin, withdraw the old block and reinsert the pin through the new one.

I claim as my invention—

1. The combination, substantially as described, of the clip C, its pin F, rubber block H, and eccentric grooves $b$, with the pole or shaft D, recessed at the end, and having projections $d\ d$ adapted to the said eccentric grooves $b$.

2. The combination of the subject-matter of the first claim and the detachable pin F, arranged as specified.

In testimony whereof I have hereunto set my hand in the presence of two subscribing witnesses.

WILLIAM W. WALLIS.

Witnesses:
WM. A. STEEL,
HARRY SMITH.